Figure 1:
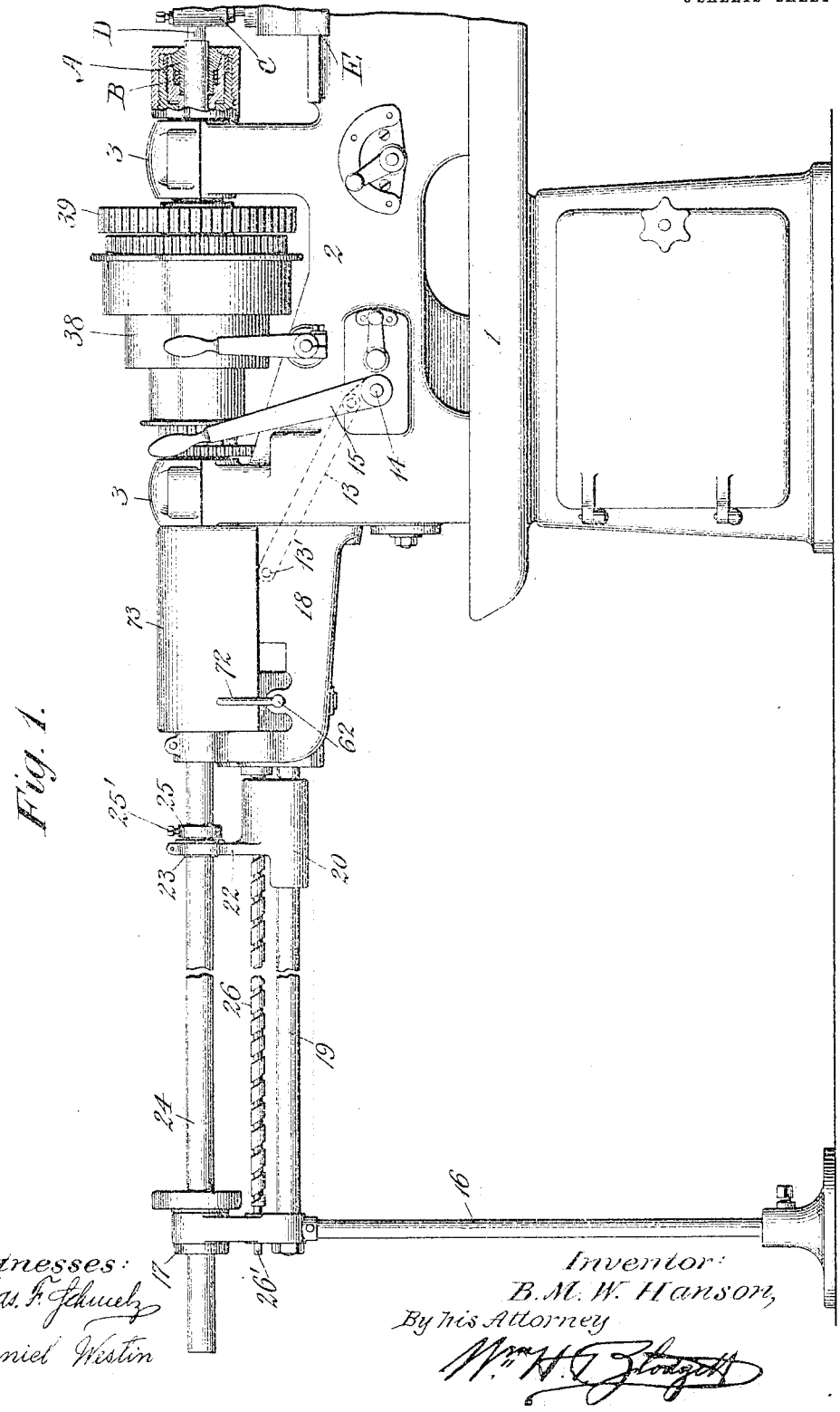

No. 782,241. PATENTED FEB. 14, 1905.
B. M. W. HANSON.
SCREW FEED MECHANISM FOR METAL WORKING MACHINES.
APPLICATION FILED NOV. 9, 1903.

3 SHEETS—SHEET 1.

Witnesses:
Chas. F. Schmelz
Daniel Westin

Inventor:
B. M. W. Hanson,
By his Attorney
Wm. H. Blodgett

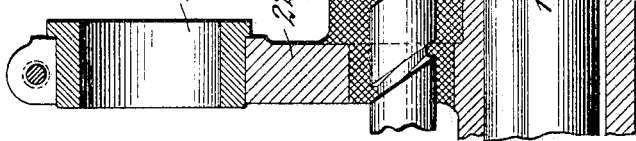

No. 782,241. PATENTED FEB. 14, 1905.
B. M. W. HANSON.
SCREW FEED MECHANISM FOR METAL WORKING MACHINES.
APPLICATION FILED NOV. 9, 1903.
3 SHEETS—SHEET 3.
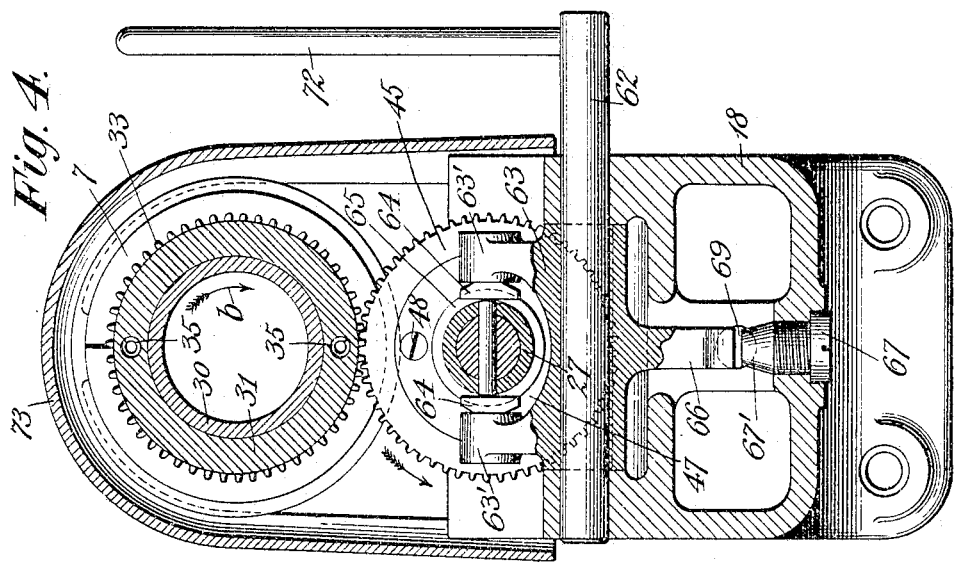
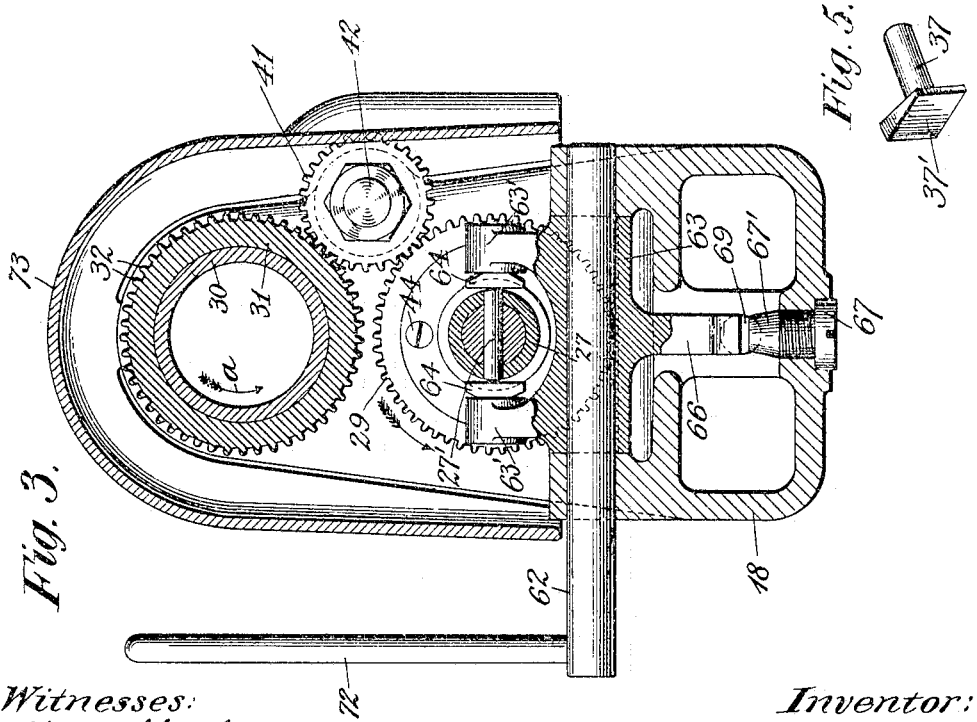
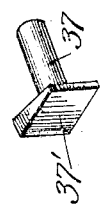
Witnesses:
Chas. F. Schmelz
Daniel Westin
Inventor:
B. M. W. Hanson,
By his Attorney No. 782,241. Patented February 14, 1905.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

SCREW FEED MECHANISM FOR METAL-WORKING MACHINES.

SPECIFICATION forming part of Letters Patent No. 782,241, dated February 14, 1905.

Application filed November 9, 1903. Serial No. 180,320.

*To all whom it may concern:*

Be it known that I, BENGT M. W. HANSON, a citizen of Sweden, residing at Hartford, in the county of Hartford and State of Connecticut, have invented certain new and useful Improvements in Screw Feed Mechanism for Metal-Working Machines, of which the following is a specification.

My invention relates to feed mechanism for metal-working machines, and has for its object the provision of improvements whereby stock will be fed positively to or through the chuck and the feed will be arrested automatically when the stock has been advanced to the desired extent against the usual stop.

A further object of the invention is the provision of a shiftable screw for actuating the stock-feeding device and of driving and reversing mechanism for rotating said screw.

A further object of the invention is the provision of a feed device, a shiftable screw for actuating said device, a clutch rigid with the shiftable screw, and gearing controlled by said clutch for turning the screw in opposite directions.

Other objects of the invention will be hereinafter set forth.

In the accompanying drawings, Figure 1 is a side elevation with portions in section of a part of a metal-working machine, showing my invention applied thereto. Fig. 2 is a longitudinal vertical section of part of the mechanism illustrated in Fig. 1. Fig. 3 is a transverse section on line 3 3 of Fig. 2. Fig. 4 is a transverse section on line 4 4 of Fig. 2. Fig. 5 is a perspective view of a clutch-pin hereinafter described.

Like characters designate similar parts throughout the several views.

Referring to the drawings, the numeral 1 designates the frame of the machine, which may be of any suitable kind, and 2 a head having bearings 3 3, in which is journaled the usual hollow spindle 4, carrying a chuck A. Within this spindle is mounted a chuck-actuating sleeve 6, through which the stock is fed, and to a collar 7, threaded on the spindle, are pivoted levers 8 8, having noses or projections 8' 8', which bear against the rear end of said chuck-actuating sleeve. On the hollow spindle 4 is a sleeve 9, having a conical end 9' and a circular groove 9², the latter receiving a fork 10 for reciprocating the sleeve upon said spindle, to thus actuate the levers and cause the sleeve 6 to close the chuck A upon the stock. These devices constitute a conventional stock-chucking mechanism, which constitutes no part of my invention, and they are fully shown and described in my patent dated October 21, 1902, No. 711,851, and may be replaced by other devices, if desired.

Fork 10 projects from a slide 11, which is fitted for movement in ways 12 of the frame, and while any desired means may be employed for reciprocating said slide I have shown a link 13, articulated to the slide at one end at 13' and connected at its opposite end to an arm of a rock-shaft 14, journaled in the frame, as shown in Fig. 1. A hand-lever 15 is secured to the rock-shaft and serves as a means for actuating the same, and thereby reciprocating the slide 11.

Designated by 16 is a standard, in the upper end of which is mounted a bushing 17 for the reception of the stock, and said upper end is connected with a bracket 18 of head 2 by a guide-rod 19. Mounted upon this guide-rod is a sleeve 20, carrying a nut 21, and projecting from the sleeve 20 is an arm 22, in the split upper end of which is fitted a collared bushing 23.

Designated by 24 is the stock to be fed, and in the exemplification given a slip-collar 25 is clamped to the stock by a screw 25' and serves as an abutment with which the bushing 23 will engage when the sleeve 20 is actuated by means hereinafter described.

Designated by 26 is a screw having a reduced shank 26', journaled for sliding movement in the upper part of standard 16. At its end opposite the shank 26' said screw is provided with a barrel portion 26², and to this barrel portion is pinned or otherwise rigidly attached a double clutch 27.

In a bearing of the bracket 18 is journaled the long tubular hub 28 of a gear-wheel 29, and pinned in another bearing of said bracket is a tube 30, upon which is mounted a sleeve 31, having gear-teeth 32 at one end and other gear-teeth 33 at its opposite extremity. Said sleeve 31 is recessed to receive clutch-pins 34 backed by springs 35, as illustrated in Fig. 2, and on the rear end of the chuck-spindle 4 is secured a collar 36, having a bore for the reception of a clutch-pin 37, with an inclined face 37', as illustrated in Fig. 5, the construction being such that when the geared sleeve 31 is rotated in one diection one of the clutch-pins 34 will come into contact with the end of face 37', and when rotated in an opposite direction said clutch-pins 34 will slip over face 37' and will not engage the same.

Any desired means may be employed for rotating the chuck-spindle 4, that shown consisting of the usual cone-pulley 38 and ordinary back gearing 39.

To prevent longitudinal movement of the sleeve 28, carrying gear 29, a collar 40 is secured to the outer end of said sleeve, as shown in Fig. 2.

As will be observed by reference to Fig. 3, when the sleeve 31 is rotated in the direction of the arrow $a$ the gear 32 thereof will engage an idler 41, journaled on a stud 42 of the bracket 18 and in engagement with the gear 29 of sleeve 28, thus actuating said sleeve 28 in the same direction as the chuck-spindle 4 and reversing the screw 26. This gear 29 is provided with a clutch-face 43, (shown secured in a recess thereof by screws 44.)

Designated by 45 is a gear-wheel in mesh with the gear 33 of sleeve 31, said gear wheel having a hub 45' fitted in a bearing 46 of the bracket 18 and being provided with a clutch-face 47, secured in a recess of its inner side by screws 48. To prevent longitudinal play of the gear 45 and its hub 45', a collar 49 is secured to the end of the hub by a screw 50, and said collar bears against the outer side of the bearing 46, as illustrated in Fig. 2.

At its inner extremity the barrel of the screw 26 is provided with a chamber 51, and in the outer end of said chamber is threaded a perforated screw 52, said screw being locked against rotation by a set-screw 53. Inserted in the bore of screw 52 is a rod 54, provided at its reduced inner end with a head 55, secured in place by a key 56, said rod having at its opposite extremity another and larger head 57, longitudinally grooved at 57'. Slide 11 is recessed at 58 for the reception of the head 57, and a spiral spring 59 surrounds the rod 54 and bears at one end against said head 57. At its opposite end this spring is received in a chamber of a tubular screw 60, threaded into the bore of the slide 11, and to prevent the rod from turning a screw 61 is provided with a flattened portion 61', which enters the longitudinal groove 57' of the head.

Designated by 62 is a rock-shaft having a hub 63 keyed thereto, and this hub has projecting from its upper portion a fork 63', having shoes 64 fitted in a groove 65 of the clutch 27, and said hub 63 is also provided with a depending arm 66 for a purpose hereinafter stated.

Threaded into the lower part of bracket 18 is a screw 67, having a conical end 67', and in said bracket, at right angles to the opening in which the screw is inserted, are chambers 68 for the reception of plungers 69 and springs 70, one of said chambers 68 being closed by a screw 71, as illustrated in Fig. 2. At their inner ends these plungers bear against arm 66 and are beveled at 69' to conform to the conical surface 67' of screw 67.

A handle 72, rigid with the rock-shaft 62, serves as a means for manipulating the same to throw the clutch 27 into or out of engagement with either of the clutch-surfaces 43 47, and as said clutch is keyed to the screw 26 at 27' it follows that the screw will be moved longitudinally when the rock-shaft 62 is actuated.

For protecting the mechanism on bracket 18 a hood or cover 73 is employed, as shown in Figs. 1 to 4.

In many screw-machines, cutting-off machines, and other apparatuses of the class to which my invention appertains for working metal it is customary to feed the stock against a stop, and thus to limit the projection thereof to the desired extent from the end of the chuck. Machines of this character are well known, and it has therefore not been deemed necessary to illustrate all of their common features, a turret C, its stop D, and slide E being, however, shown.

As will be observed by reference to Fig. 2, the spring-actuated plungers 69, bearing against the arm 66 of rock-shaft 62, normally tend to shift the screw 26 and throw the clutch 27 to a neutral position, with its teeth out of engagement with either of the complemental clutch-surfaces, and to obtain a feed of the stock the lever 15 is first grasped and moved toward the right, thereby, through the link 13 and slide 11, withdrawing the cone-sleeve 9 from beneath the ends of levers 8, thus permitting the chuck-actuating sleeve 6 to be retracted by the usual means, such as a spring B, for accomplishing this result and the chuck to be released. As the slide 11 moves toward the right rod 54 will be carried with it, the head 55 of said rod sliding in the bore 57 of the feed-screw 26 until it comes into contact with the inner end of the screw 52, when said feed-screw 26 will be shifted to throw clutch 27 into engagement with clutch-surface 47 of gear 45, said gear rotating the screw in a direction to enable a feed of the stock to take place. In the illustrations the sleeve 20 is shown as fed forward substantially to the limit of its movement, its arm 22 bearing against the shiftable collar 25, and the stock being advanced through the open chuck to the desired extent, as limited by the usual turret or other stop D, and the lever 15 has been shifted to the left to cause the cone-sleeve 9 to actuate levers 8 and close the chuck upon the stock. When it is desired to run the slide 20 outward again to provide for another series of successive feeds, the lever 72 is thrown to the left and the screw 26 is shifted to throw clutch 27 into engagement with the clutch-surface 43 of gear-wheel 29, thus causing the screw to be rotated in a direction to withdraw the sleeve 20 and nut 21 along guide-rod 19 to a position in readiness for this action and when during this reverse movement the end of sleeve 20 strikes standard 16 the screw will be shifted to the right to withdraw the clutch from surface 43 and again stop the rotation of said screw. Slip-collar 25 is then adjusted upon the stock 24 and is rigidly secured in position thereon by screw 25', after which lever 15 is thrown to the right, thereby actuating slide 11 and, through the lost-motion connection described, feed-screw 26 in the same direction, thus permitting the chuck to open and causing an engagement of said clutch with the complemental clutch 47 of gear-wheel 45. When this is done, the feed-screw 26 is, as stated, shifted longitudinally through the hub of gear 45 until the clutch engagement takes place, and the gear 33 will then drive gear 45 in an opposite direction to that of gear 29 (see arrow b, Fig. 4) and will cause the feed-screw to shift the sleeve 20 (carrying nut 21) along guide-rod 19 until the end of the stock comes into contact with the turret or other stop D of the machine in front of the chuck when, as the stock cannot further advance, the movement of slide 20 is also stopped; but as the feed-screw 26 is still in rotation something must give, and consequently the feed-screw shifts itself bodily through the now stationary nut 21, and thus disengages the clutch from gear 47, thereby stopping the rotation of said feed-screw. These operations are repeated as long as the machine is in action, and when the feed has been accomplished the clutch is always thrown to a neutral position out of engagement with the clutch-surfaces of the gear-wheels 29 and 45, as illustrated in Fig. 2. Should the spindle 4 be driven in a reverse direction to that in which it is actuated while the machine is in operation upon stock, no motion will be imparted to the sleeve 31 and its gears 32 and 33, for the inclined clutch-face of pin 37 will slip over and shift the spring-actuated plungers 34 without engaging said plungers. It will be clear from the above description that at the limit of movement of the sleeve 20 in the reversing direction screw 26 will be shifted to throw the clutch out of engagement with gear 29, and that when the lever 15 is swung to the right the chuck will first be released and then the screw will be shifted to throw the clutch into engagement with gear 45, thus starting the feed, and that when the end of the stock strikes the stop the screw will again be shifted to throw the clutch to a neutral position and stop said feed.

In connection with the operation just described it should be noted that the slide 11 during the first portion of its movement toward the right, when thus actuated by lever 15, will move the sleeve 9 out of engagement with the levers 8, and subsequently pull the feed-screw bodily toward the right and against the action of the left plunger-spring 70, which is of less strength than the spring 60, and so that no compression of the latter will result. Consequently it follows that the feed-screw can yet shift itself (at the end of the feed movement) to the left, since the spring 60 will yield and allow rod 54 to be shifted relatively to the slide 11, even if the hand-lever 15 should be held in its right-hand position, so that all danger of breaking any of the operating parts is effectively obviated.

While manual devices are shown for actuating the clutch-operating mechanism and the feed mechanism, it is distinctly to be understood that the invention is not limited thereto, nor is it limited to the kind of gearing shown nor to the form and proportions of said gearing.

Various means different from those shown may be employed for shifting the feed-screw and its attached clutch without departure from the invention, and the proportions and arrangement of the parts may be widely varied from the manner in which they are shown assembled. So, too, any suitable device or devices for engaging and advancing the stock may be substituted for the construction illustrated, and various kinds of slip connection may be employed between the slide 11 and the screw without departure from the invention.

Having thus described my invention, what I claim is—

1. The combination, with a shiftable feed-screw, of a nut coöperating with said feed-screw; means controlled by the nut for feeding stock; mechanism for rotating the feed-screw; and a clutch carried by the feed-screw, and adapted to engage an element of said mechanism when the screw is shifted.

2. The combination, with a shiftable screw, of a stock-feeding device controlled by the screw; a clutch shiftable with the screw; and means with which the clutch is adapted to engage when shifted for rotating said screw.

3. In stock-feeding mechanism, the combination, with a longitudinally-shiftable screw, of a clutch shiftable and rotatable with said screw; gearing for engaging the clutch and driving said screw when it is shifted, and a feed device actuated by the screw.

4. In stock-feeding mechanism, the combination, with a longitudinally-shiftable screw, of a clutch shiftable and rotatable with the screw; means for alternately engaging the clutch when shifted to drive said screw in opposite directions; and a feed device actuated by the screw.

5. The combination, with a screw, of a nut in which the screw works; a feed device controlled by the nut; a clutch carried by the screw and shiftable therewith; gearing for driving the screw in one direction; gearing for driving the screw in the opposite direction; and means for shifting the screw and clutch to cause the clutch to engage an element of either set of gearing.

6. The combination, with a shiftable screw, of a stock-feeding device actuated by said screw; a clutch carried by the screw; mechanism for engaging the clutch and thus driving the screw; and a stop against which the stock is fed, said stop causing the screw to be shifted to throw the clutch to a neutral position.

7. The combination, with a shiftable screw, of a nut in engagement with said screw; a stock-feeding device actuated by the nut; a rotary, tubular spindle; a stop for limiting the feed of the stock; a clutch carried by the screw; and mechanism for engaging the clutch and driving the screw to advance the stock against said stop, whereby the screw will be shifted to throw the clutch to a neutral position to arrest the feed.

8. The combination, with stock-feeding mechanism, of a shiftable screw for actuating said mechanism; a clutch shiftable with said screw; mechanism for driving the clutch and screw in one direction; mechanism for driving said clutch and screw in an opposite direction; means for shifting the screw to throw the clutch into engagement with either of its driving mechanisms; and means for shifting the screw to throw the clutch to a neutral position.

9. The combination, with a longitudinally-shiftable screw, of a clutch rigid with said screw; a sleeve having an arm adapted to engage a collar on the stock; a nut carried by the sleeve; a guide for the sleeve; gearing for driving the clutch and screw in a direction to advance the stock; and a stop for limiting the feeding movement of the stock, to thereby shift the screw and throw the clutch out of connection with said gearing.

10. The combination, with a longitudinally-shiftable screw, of a clutch rigidly secured to said screw; a gear sleeved upon the screw, and having a clutch-surface; means for driving said gear; a nut in engagement with the screw; a stock-feed device actuated by the nut; and a stop against which the stock is fed, whereby the screw will be shifted to throw the clutch out of engagement with its driving-gear.

11. The combination, with a tubular spindle, and with means for rotating the same, of a gear; a clutch for connecting said spindle and gear when the spindle is rotated in one direction; a gear in engagement with the gear driven by the spindle, and having a clutch-surface; a shiftable screw; a clutch rigid with said screw; a stock-feed device actuated by the screw; a chuck carried by the spindle; means for actuating said chuck; and a shiftable stop against which the stock is fed.

12. The combination, with a shiftable screw, of a two-faced clutch rigid with said screw; a stock-feed device actuated by said screw; gears, each having a clutch-surface loosely mounted on the screw; means for rotating said gears in opposite directions; means for shifting the screw to throw the clutch into engagement with either of said gears; and means for normally actuating said screw to throw the clutch to a position out of engagement with the clutch surfaces of said gears.

13. The combination, with a shiftable screw, of a clutch carried by said screw; a feed device actuated by the screw; a rotary spindle; a chuck carried by the spindle; a sleeve for actuating said chuck; means for actuating the sleeve; a driven element loose upon the screw and with which the clutch co-operates; means controlled by the spindle for actuating said driven element; a stop; and a yielding device between a part of the chuck-actuating means and said screw.

14. The combination, with a tubular spindle, of a chuck carried by said spindle; a chuck-actuating sleeve within the spindle; devices for operating said sleeve; a screw; a gear element loose upon the screw; means controlled by the spindle for driving said gear element; a clutch rigid with the screw and adapted when the screw is shifted to be thrown into and out of engagement with said gear element; a feed device actuated by the screw; a stop; and yielding means for connecting the screw with an element of the chuck-actuating devices.

15. The combination, with a tubular spindle, of a chuck carried by said spindle; a sleeve within the spindle for actuating the chuck; mechanism for operating the sleeve; a shiftable screw having a chambered end; a clutch upon said screw; a gear-wheel loosely mounted upon the screw and having a clutch-surface; means for actuating said gear-wheel; a feed device actuated by the screw; a stop; a rod having a head movable within the chambered end of the screw; means for yieldingly connecting said rod with an element of the chuck-actuating devices; and means for shifting the screw.

16. The combination, with a shiftable screw, of a clutch rigid with the screw; gears loose upon the screw and each having a clutch-surface; means for driving said gears in opposite directions; a feed device actuated by the screw; a rock-shaft having an arm in engagement with the clutch; and means for actuating said rock-shaft.

17. The combination, with a screw, of means for shifting said screw; a feed device actuated by the screw; mechanism for rotating the screw; and means on the screw for connecting the screw with said mechanisms when said screw is shifted.

18. The combination, with a shiftable screw, of means for shifting said screw; a feed device actuated by the screw; mechanisms for rotating the screw in opposite directions; and a clutch shiftable with the screw and adapted to connect it with either of said mechanisms.

19. The combination, with a tubular spindle, of a sleeve having gear-surfaces; means for clutching said spindle and sleeve; a shiftable screw; a gear loose on the screw, and in direct connection with one of the gear-surfaces of the sleeve; a second gear loose on the screw; an idler connecting said second gear with the other gear-surface of the sleeve; a clutch rigid with the screw between the two loose gears; and a stock-feed device actuated by the screw.

20. The combination, with a shiftable screw, of a stock-feeding device actuated thereby; a tubular spindle; a chuck carried by said spindle; mechanism for actuating said chuck; a lost-motion connection between an element of said mechanism and the screw; a clutch rigid with the screw; a gear loose on the screw, and having a clutch-surface; and means for driving said gear.

21. The combination, with a shiftable screw and stock-feeding devices actuated by said screw, of a tubular spindle; a chuck carried by said spindle; means for actuating said chuck; a slide constituting a part of said means; a lost-motion connection between said slide and the screw; a clutch rigid with the screw; a gear loose on the screw and having a clutch-surface; and means for driving said gear.

22. The combination, with a shiftable screw, of a stock-feeding device actuated thereby; a tubular spindle; a chuck carried by said spindle; mechanism for actuating the chuck; a lost-motion connection between said mechanism and the screw; a clutch rigid with the screw; a pair of gears loose on the screw, and each having a clutch-surface; and means for driving said gears in opposite directions.

23. The combination, with chuck-operating mechanism, of a shiftable screw having a chamber; a stock-feeding device actuated by said screw; a stop; means for driving said screw; a device for clutching said screw with its driving means; a lost-motion connection having a head fitted in the chamber of the screw; means for actuating said connection; and means for connecting said lost-motion connection with the chuck-operating mechanism.

24. The combination, with a tubular spindle, of a shiftable screw; a feed device carried by said screw; a chuck carried by the spindle; a chuck-actuating sleeve; means for operating said sleeve; a slide constituting a part of said means; a lost-motion connection between the screw and slide; a gear loose on the screw, and having a clutch-surface; and a clutch carried by the screw, and adapted when the latter is shifted to be thrown into engagement with said clutch-surface.

25. The combination, with a tubular spindle and its chuck, of a chuck-actuating sleeve within the spindle; levers pivoted to the spindle, and having arms in engagement with said chuck-actuating sleeve; a cone mounted on the spindle and adapted to actuate the levers; a slide having a part connected with the cone, said slide being chambered; means for actuating the slide; a screw having a chamber; a rod having a pair of heads, one of which is mounted in the chamber of the screw, and the other in the chamber of the slide; a spring surrounding said rod in the chamber of the slide; a gear loose on the screw; means controlled by the spindle for driving said gear; a clutch rigid with the screw, and adapted when the latter is shifted to be thrown into engagement with said gear; a stop; and a feed device actuated by the screw.

26. The combination, with a tubular spindle, and its chuck, of a chuck-actuating sleeve within the spindle; pivoted levers carried by the spindle and having arms adapted to engage said chuck-actuating sleeve; a cone-sleeve on the spindle; a chambered slide connected with said cone-sleeve; a rod having heads, one of which is mounted in the chamber of the slide; a spring surrounding said rod adjacent to said head; a shiftable screw having a chamber in which the other head of the rod is fitted; a pair of gears loose on the screw; a clutch rigid with the screw intermediate said gears; means actuated by the spindle for driving said loose gears in opposite directions; a stop; and a stock-feed device actuated by said screw.

27. The combination, with a shiftable screw, of a feed device actuated by said screw; a pair of opposing gears loose on the screw; each gear having a clutch-surface; a clutch carried by the screw between said clutch-surfaces; means for driving the gears in opposite directions; means for shifting the screw to throw the clutch to a neutral position; and means for shifting the screw to throw the clutch into engagement with either of its driving-gears.

28. The combination, with a shiftable screw, of a feed device actuated by said screw; opposing gears, each having a clutch element loose on the screw; means for driving said gears in opposite directions; a clutch carried by the screw between said gears; a rock-shaft having a fork in engagement with the clutch, and also having an arm; spring-actuated plungers bearing against said arm; and means for actuating said rock-shaft.

29. The combination, with a tubular spindle, of a shiftable screw; a feed device actuated by said screw; a chuck carried by the spindle; a chuck-actuating sleeve within the spindle; means for operating said sleeve; a slide constituting a part of said means; means for actuating the slide; a lost-motion connection between the screw and slide; a pair of opposing gears loose on the screw, each having a clutch element; means for driving said gears in opposite directions; a clutch carried by the screw intermediate said opposing gears; means for shifting the screw and clutch; and means for normally shifting the screw to throw the clutch to a neutral position.

30. In a machine of the class described, the combination with a tubular spindle and its chuck, of a chuck-actuating sleeve; means for operating said sleeve; a tube rigid with the frame and in alinement with the chuck-actuating sleeve; a sleeve loose on said tube; a collar secured to the spindle; a clutch between the sleeve and collar; a shiftable screw; opposing gears loose on said screw, each having a clutch element; a clutch rigid with the screw between the clutch elements of said gears; a gear on the sleeve for directly driving one of the opposing gears; a second gear on the sleeve; an idler connecting said second gear with the other opposing gear; means for manually shifting the screw and clutch; and means for automatically shifting said screw to throw the clutch to a neutral position.

31. The combination, with a shiftable screw, of a feed device actuated by said screw; mechanism for driving said screw in a direction to actuate the feed device; means for shifting said screw at the termination of the feed movement; mechanism for reversing the screw; means for again shifting the screw at the limit of its reversing movement; and means for connecting the screw with either of its actuating mechanisms.

In testimony whereof I affix my signature in presence of two witnesses.

BENGT M. W. HANSON.

Witnesses:
ARTHUR E. THAYER,
ANGUS BALLARD.